United States Patent [19]
Granberg

[11] Patent Number: 6,122,510
[45] Date of Patent: Sep. 19, 2000

[54] METHOD AND APPARATUS FOR PROVIDING NETWORK-SPECIFIC MOBILE SERVICES

[75] Inventor: Christer Granberg, Stockholm, Sweden

[73] Assignee: Telefonaktiebolaget LM Ericsson, Stockholm, Sweden

[21] Appl. No.: 08/964,212

[22] Filed: Nov. 4, 1997

[51] Int. Cl.$^7$ .................................................. H04Q 7/24
[52] U.S. Cl. ...................... 455/433; 455/432; 455/461
[58] Field of Search ................................. 455/432, 433, 455/412, 414, 422, 435, 436, 461, 507; 379/207, 194, 211, 212, 230

[56] References Cited

U.S. PATENT DOCUMENTS

| | | | |
|---|---|---|---|
| 5,452,350 | 9/1995 | Reynolds et al. | 379/220 |
| 5,497,412 | 3/1996 | Lannen et al. | |
| 5,579,379 | 11/1996 | D'Amico et al. | 379/112 |
| 5,758,281 | 5/1998 | Emery et al. | 455/428 |
| 5,839,076 | 11/1998 | Becher | 455/461 |
| 5,845,203 | 12/1998 | LaDue | 455/414 |
| 5,845,211 | 12/1998 | Roach, Jr. | 455/436 |
| 5,890,063 | 3/1999 | Mills | 455/433 |

FOREIGN PATENT DOCUMENTS

| | | |
|---|---|---|
| 195 15 558 | 9/1996 | Germany . |
| 93/16543 | 8/1993 | WIPO . |
| 96/13949 | 5/1996 | WIPO . |

OTHER PUBLICATIONS

Smith, D.G., "An Introduction to GSM Enhancements for Operation Specific Services (CAMEL)," *IEE Colloquium on Mobile Communications Towards the Next Millenium and Beyond*, May 17, 1996.

Holley, K.A., "Global System for Mobile Communications—What's In Store?" *BT Technology Journal*, vol. 14, No. 3, Jul. 1996, pp. 47–54, XP000598154.

Skolt, E., et al., "Intelligent Networks as a Platform for Provision of Service in GSM and DECT," *Teletronikk*, vol. 91, No. 4, Jan. 1995, pp. 82–87, XP000605908.

Garg, V.K., et al., "Subscriber Data Management in Personal Communications Services Networks," *IEEE Personal Communications*, vol. 4, No. 3, Jun. 1997, pp. 33–39, XP000655314.

European Telecommunications Standards Institute (ETSI), TS 101 044 V5.1.0 (1997–08), Technical Specification, Digital cellular telecommunications system (Phase 2+); Customized Applications for Mobile network Enhanced Logic (CAMEL)—Stage 2, (GSM 03.78 version 5.1.0).

*Primary Examiner*—Daniel S. Hunter
*Assistant Examiner*—Pablo N. Tran
*Attorney, Agent, or Firm*—Nixon & Vanderhye

[57] ABSTRACT

Basic mobile telephony services are provided to mobile communication units operating within home and visiting mobile communication networks. The home and visiting mobile communication networks each include one or more mobile switching nodes that direct calls to and from mobile communication units. A home network database stores subscriber records for mobile communication units subscribing to basic telephony services from the home mobile communications network. The home network database also stores information relating to one or more network-specific services being offered in the home or the visiting network. At least some of the subscriber records in the home database include a flag indicating whether the mobile communications unit corresponding to that subscriber record is to receive the network-specific service. When a mobile unit registers or performs a location update procedure, the network-specific service information is transferred from that mobile's home network database to a node currently servicing that mobile communications unit if the flag is set in that mobile subscriber's database record. After receiving that network-specific service information for the mobile communications unit being served, the network-specific service is provided to the mobile communications unit when appropriate.

31 Claims, 5 Drawing Sheets

METHOD AND APPARATUS FOR PROVIDING NETWORK-SPECIFIC MOBILE SERVICES

RELATED APPLICATIONS

This application is related to the following (all of which are incorporated herein by reference), U.S. patent application Ser. No. 08/912,929, entitled "Transfer of Calling Party Identification in a Mobile Communication System," filed Aug. 15, 1997; U.S. patent application Ser. No. 08/986,387, entitled "Method and Apparatus for Coordinating Mobile Communications Network Services With Intelligent Network-Based Services," filed Dec. 8, 1997; and U.S. patent application Ser. No. 08/971,735, entitled "Providing Notification of Location Dependent Services to Mobile Radios," filed Nov. 17, 1997.

FIELD OF THE INVENTION

The present invention relates to providing services to mobile stations in a mobile communications system, and more particularly, to efficiently establishing and administering one or more mobile network-specific mobile services.

BACKGROUND AND SUMMARY

In mobile radio communication networks, such as cellular telephone systems, neighboring radio cells provide coverage of a geographical area to be serviced. Each cell has a base station (BS) operated on a set of radio channels. Over such radio channels communications are provided to and from mobile subscribers. A mobile switching center (MSC) controls calls between a group of base stations and the public switched telephone network (PSTN), integrated services digital network (ISDN), and one or more public land mobile radio networks (PLMN). The MSC performs functions such as call switching, routing, and charging.

All mobile communication networks provide the "basic call services" required for making and receiving calls in home and in foreign (hereinafter referred to as "visiting") mobile communication networks. In fact, known cellular systems like the Nordic Mobile Telephone System (NMT), the Total Access Communication System (TACS), the American Digital Cellular System (ADC), the Global System for Mobile Communication (GSM), and the Pacific Digital Cellular System (PDC) have all adopted standardized techniques for providing such basic services. Basic service includes calls to/from individual mobile subscribers and other services available to all mobile subscribers that do not require an individual service subscription.

Intelligent networks (IN) were developed to provide additional, more flexible services to supplement existing telephony services in the fixed telephony network. More recently, such IN-based services have also become necessary and/or desirable in mobile telecommunications networks. The term "standard supplementary services" is defined to include those supplementary mobile services which generally require an individual subscription and which are generally supported by most mobile communication networks (hence the term "standard"). Standard supplementary services include for example call waiting, call forwarding, and call barring. Standard supplementary subscriber services may be divided into two types: (1) those which modify or supplement the process of "originating" a call, and (2) those which modify or supplement the process of "terminating" a call. Examples of originating supplementary services include: barring of outgoing calls and closed user group. Examples of terminating supplementary services include: barring incoming calls, call forwarding, and call waiting.

A third category of services to which the present invention is particularly directed is network-specific supplementary mobile services. Network-specific services are generally offered to all mobile subscribers currently within that network. While the term "network-specific" is used for purposes of description, the term includes any location or service area that can offer services to mobile stations specifically in its area. In contrast to the standard supplementary services generally offered by many mobile communication networks, network-specific supplementary services are not standardized and are not generally offered by many mobile networks or are offered in different manners in different networks. This is because network-specific services are designed by individual network operators using intelligent network type tools, such as switch-based functions, or other means available in a particular network. Network-specific services help an operator distinguish itself from other operators by offering unique, specially-tailored services for mobiles being served by that operator's network.

The present invention is particularly concerned with providing such network-specific supplementary services to mobile stations even when those mobile stations are roaming outside of their home mobile communications network. Because the location of mobile stations may be continually changing, a database is generally used in each mobile communications network to keep track of particular mobile subscribers such as the home location register (HLR) used in the GSM cellular system. The HLR stores information for each mobile subscriber such as the mobile subscriber's (1) identification, (2) location—typically corresponding to the MSC currently serving the present location of the mobile subscriber, and (3) supplementary subscriber services.

In the example GSM mobile communications system, (adopted for purposes of explanation and not limitation), efforts have been made to develop Intelligent Network (IN) capabilities for mobile network operators in the Customized Applications for Mobile Network Enhanced Logic (CAMEL) standard published by the European Telecommunications Standards Institute (ETSI) as GSM Technical Specification 03.78. The goal of the CAMEL standardization process is to provide mobile network operators with the capability to quickly design and offer new and enhanced mobile network-specific services using intelligent network type tools, e.g., service logic building blocks, service databases, service "trigger" or "detection" points, etc. For example, a service control point (SCP) node stores and implements service logic invoked to provide supplementary services. A service switching point (SSP) node handles service detection and switching functions necessary to invoke services at the SCP. However, to reconcile the mobility of the subscribers in this IN framework, functions performed by the HLR, the SCP, and the MSC must be coordinated.

In order to provide IN-based, network-specific services to mobile subscribers, network-specific service subscription information, (referred to in the GSM CAMEL example as CAMEL Subscription Information (CSI)), must be stored in the subscriber record for each mobile subscriber. In CAMEL, such services to be invoked at the origination of a call from a mobile subscriber are indicated with originating-CSI (O-CSI), and CAMEL services to be invoked for a terminating call to a mobile subscriber are indicated with terminating-CSI (T-CSI). The CSI includes specific data including a service key, a gsmSCF address, and a default call handling procedure indication. The service key identifies service control function (SCF) service logic contained in an SCP node corresponding to a network-specific supplementary service. The SCF address identifies the specific SCP node where the corresponding service logic resides. The default call handling procedure indication is followed if something goes wrong in the process of invoking the network-specific supplementary service.

When a mobile subscriber registers at a visiting mobile communications network, that mobile subscriber's O-CSI must be sent from the HLR to the visiting mobile communications network as part of the typical mobile subscriber location update procedure. The O-CSI is stored at the visiting location register (VLR) database serving the area in which the mobile subscriber is currently located. Thereafter, when that mobile subscriber initiates or forwards a call, the visiting network MSC/VLR detects the O-CSI stored for that subscriber in the VLR. In effect, the CSI functions as a Detection Point (similar to an IN "trigger" point in fixed telephony networks) in the call processing which causes a transfer of control to the Service Control Point (SCP).

A drawback with the arrangement for O-CSI and T-CSI as defined in the evolving CAMEL standard is that the O-CSI and T-CSI must be provided on an individual subscriber basis. Thus, if a mobile network operator desires to provide mobile subscribers with one or more network-specific services, the network-specific supplementary service data, e.g., the O-CSI in a CAMEL-based system, must be stored in the HLR for each potential mobile subscriber that may be operating within that operator's network. This is true even though the network-specific supplementary service and service parameters may be exactly the same for all mobile subscribers.

In practice, this results in significant data processing overhead to ensure a network-specific service is available to all potential subscribers. For example, if there is a total of one million potential mobile subscribers that may use a network-specific supplementary service, one million subscriber records in HLRs must be accessed to store the same network-specific supplementary service information. While the storage of large amounts of data in HLRs is a significant task, the administering and updating of the information is also a daunting. Each time the mobile network operator desires to change the network-specific supplementary services, e.g., service enhancement, all one million HLR subscriber records must be changed.

It would seem that a solution for network-specific supplementary services might be to simply include them as a basic service. But this is not a viable or attractive option. To viably provide such services using IN-type tools like CAMEL, a subscription is required as a means to detect when to transfer control of a call over an IN node for delivery of the service. From a commercial viability, network operators want to be able to distinguish their network-specific services from the basic services all network operators provide.

It is an object of the present invention to overcome problems and drawbacks described above.

It is also an object of the invention to more efficiently store information for network-specific supplementary services for large numbers of mobile subscribers.

It is a further object to efficiently administer and update network-specific supplementary services for large numbers of mobile subscribers.

Yet another object of the invention is to achieve these efficiencies while preserving the creation and delivery of customized, supplementary mobile services in an IN-context like CAMEL.

The present invention achieves these and other objects. Basic mobile telephony services are provided to mobile communication units operating within home and visiting mobile communications networks. The home and visiting mobile networks each include one or more mobile switching nodes that direct calls to and from mobile communications units. A home network database stores subscriber records for mobile communication units subscribing to the basic telephony services from the home mobile communications network. In addition, the home network database stores information relating to a network-specific service being offered in the home or visiting network. Although the invention applies to network-specific services offered in both home and visiting networks, for purposes of illustration, the network-specific service is assumed to be provided in the visiting network. Subscriber records in the home database include a network-specific service flag. If that flag is set, the mobile communications unit corresponding to that subscriber record is to receive the network-specific service. Thereafter, when a roaming mobile communication unit registers with the visiting network, the network-specific service flag is checked. If the flag is set, the network-specific service information is copied from the home network database to the visiting network database associated with the visiting mobile switching node. The copied network-specific service information is then used at the visiting mobile switching node to provide the network-specific service when the mobile in the visiting network when appropriate.

In another embodiment, an intelligent service control node includes service logic for providing the network-specific service when the roaming mobile communications unit triggers the network-specific service while operating in the visiting network. An intelligent service switching function associated with the visiting mobile switching node detects when the roaming mobile communications unit "triggers" the network-specific service and sends a request to the service control node to invoke the network-specific service.

The network-specific service information is stored only once in the home network database for each of the visiting mobile switching nodes in a particular network that supports the specific service. Alternatively, the network-specific service information is stored only once in the home network database for a selected number series associated with several visiting mobile switching nodes that supports the network-specific service.

Accordingly, the present invention provides network-specific services to roaming mobile subscribers without having to store the detailed network specific service information in each potential subscriber's home database record. Instead, a flag set in each participating subscriber's home database record links that mobile subscriber to the network/location area specific service information so that it may be transferred when that subscriber is being serviced in that network or location area. This approach reduces considerably the amount of data that must be stored in the HLR and simplifies administration and updating of network-specific services.

BRIEF DESCRIPTION OF THE DRAWINGS

These features of the present invention and others will be described more fully below in conjunction with the drawings in which.

DETAILED DESCRIPTION OF THE DRAWINGS

In the following description, for purposes of explanation and not limitation, specific details are set forth, such as particular embodiments, data flows, signaling implementations, interfaces, techniques, etc. in order to provide a thorough understanding of the present invention. However, it will be apparent to one skilled in the art that the present invention may be practiced in other embodiments that depart from these specific details. For example, while the present invention is sometimes described in the context of an example cellular telephone network using GSM and CAMEL terminology, those skilled in the art will appreciate that the present invention can be implemented in any cellular telephone system using a variety of methods for implementing supplemental mobile services. In other instances, detailed descriptions of well-known methods, interfaces, devices, and signaling techniques are omitted so as not to obscure the description of the present invention with unnecessary detail.

Figure 1:
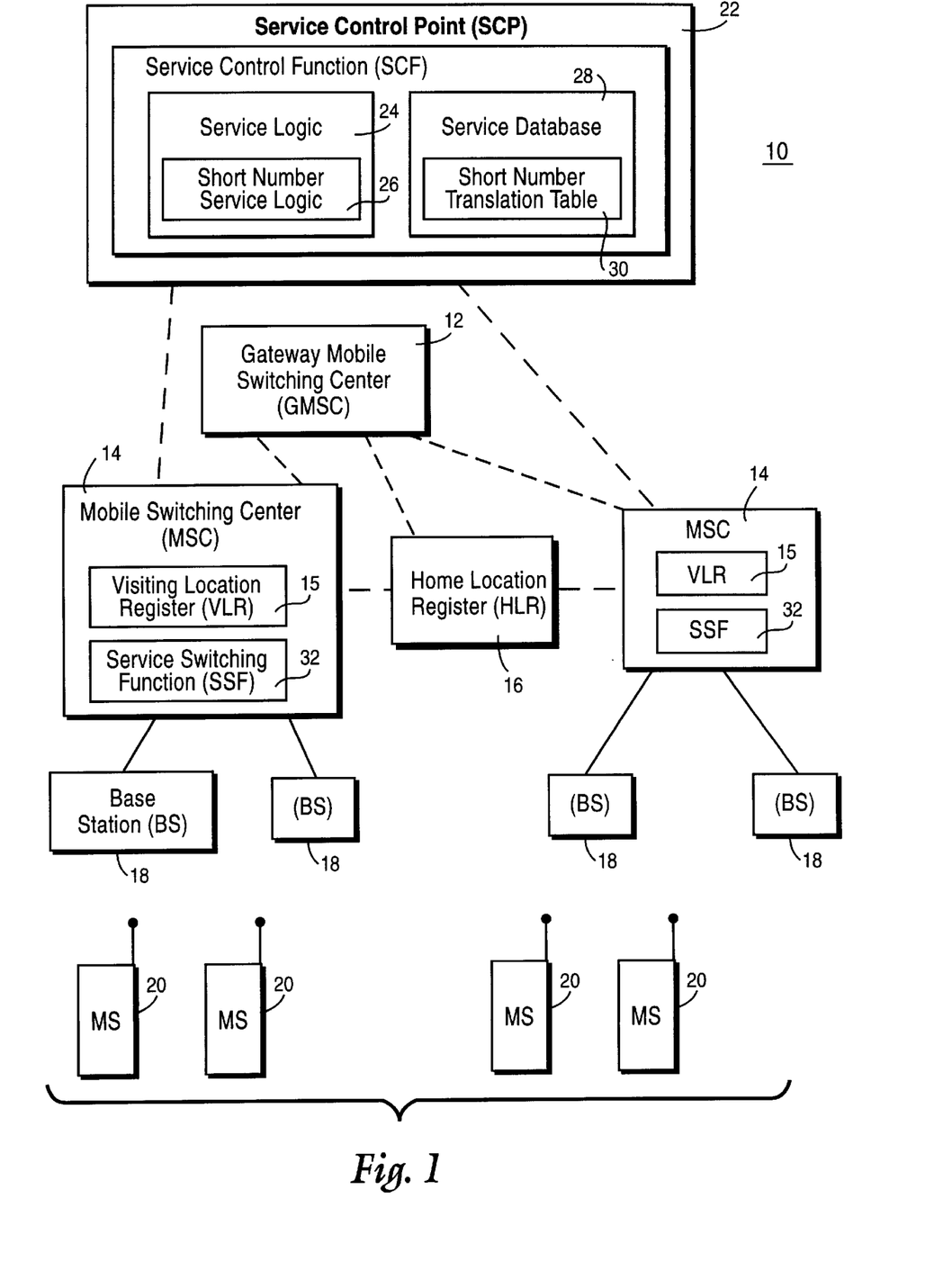
FIG. 1 is a function block diagram showing a mobile communications network in which the present invention can be implemented.

An example GSM mobile communications network 10 in which the present invention may be employed is now described in conjunction with FIG. 1. A gateway mobile switching center (GMSC) 12 interfaces with other telecommunications networks such as the public switched telephone network (PSTN), integrated services digital network (ISDN), or other cellular networks. The gateway mobile switching center 12 connects to one or more mobile switching centers (MSC) 14. The gateway MSC 12 is the interface point in the mobile radio network for calls to mobile subscribers. Although the GMSC 12 is shown as a separate node for clarity of illustration, it can be co-located with an MSC node.

Each mobile switching center 14 performs telephony switching functions associated with calls involving a mobile station (MS) 20 including interfacing with other telecommunications networks and routing mobile-originated calls. Each mobile switching center 14 is associated with a visiting location register (VLR) 15 which includes a database containing the information about all mobile stations currently located in a corresponding location or service area. The VLR 15 contains temporary subscriber information needed by the MSC 14 to provide services to mobile stations in its service area. Typically, when a mobile station enters into a visiting location or service area, the corresponding VLR requests and receives data about the roaming mobile station from the mobile's home location register (HLR) 16 and stores it. As a result, when the mobile station makes a call, the VLR already has the information needed for call set up. While the visiting location register 15 may be a stand-alone node, the VLR is preferably integrated with an MSC to eliminate signaling between the two nodes.

The home location register (HLR) 16 is a database that stores and manages subscriptions. For each "home" mobile subscriber, the HLR 16 contains permanent subscriber data such as the mobile station ISDN number (MSISDN) which uniquely identifies the mobile telephone subscription in the PSTN numbering plan and an international mobile subscriber identity (IMSI) which is a unique identity allocated to each subscriber and used for all signaling in the mobile networks. All network-related subscriber information is connected to the IMSI. The HLR 16 also contains a list of services which a mobile subscriber is authorized to use along with the current subscriber location number corresponding to a VLR address.

Once a serving MSC/VLR is identified (in the home or a visiting network), a call intended for the mobile station 20 is routed by that serving MSC/VLR to the base station 18 associated with the cell in which the called mobile station is currently located. Using well known, established protocols and procedures, the call is forwarded over the radio interface by that base station 18 to the called mobile station 20.

In a preferred, example embodiment, supplemental services are provided to mobile stations using an intelligent network (IN) or an advanced intelligent network (AIN) type infrastructure and procedures model. The Customized Applications for Mobile network Enhanced Logic (CAMEL) described in the background is one such IN-based mechanism for providing supplementary services in addition to the basic telephony services in a GSM-based network. Accordingly, the mobile switching center 14 may include a functional entity called a service switching function (SSF) 32 that interfaces the MSC 14 to a service control point (SCP) 22. The service switching function 32 is similar to that used in fixed telephony IN but uses different triggering mechanisms consistent with mobile communications networks. The points in processing of a call at which service logic execution is necessary are triggered by detection points (DP). The service control point 22 includes a Service Control Function (SCF) and service logic 24 corresponding to one or more CAMEL-constructed services. As an example, short number translation service logic 26 is shown. A service database 28 may be used by the service logic 24, and in accordance with the short number example supplementary service, may include a short number translation table 30.

Figure 2:
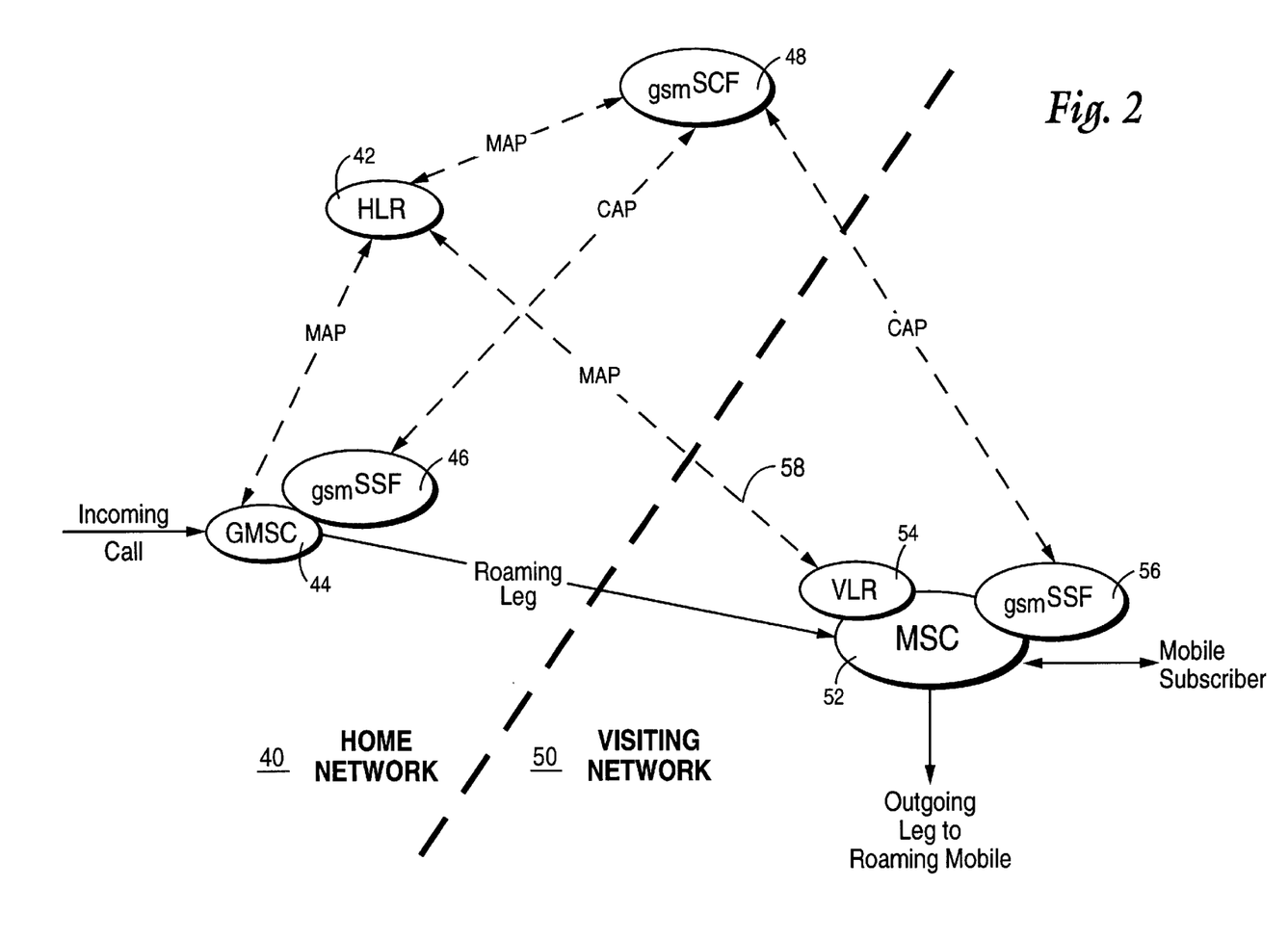
FIG. 2 is a diagram of an example GSM-based mobile communications network illustrating functional GSM entities involved in calls that use CAMEL-supported services.

As already described in the background section, in order for a mobile station to receive both basic and supplementary services in a visiting network, information regarding that mobile station must be transferred from its home location register to the MSC/VLR currently serving the mobile. Consider for example the diagram shown in FIG. 2 implemented in a GSM-CAMEL example environment where the mobile has roamed into a visiting mobile network. The home network 40 includes functional entities corresponding to the HLR 42, the GMSC 44, a gsmSSF 46, and a gsmSCF 48. The HLR 42 communicates with the GMSC 44 and gsmSCF 48 following a Mobile Application Part (MAP) protocol. The gsmSSF 46 and the gsmSCF 48 communicate using a CAMEL Application Part (CAP) protocol. The visiting mobile network 50 includes functional entities corresponding to MSC 52, VLR 54, and gsmSSF 56. The HLR 42 and VLR 54 communicate using the MAP protocol, and the gsmSCF 48 and gsmSSF 56 communicate using the CAP protocol. When an incoming call for a mobile subscriber with a home network 40 is received at the GMSC 44, a roaming leg is established between the GMSC 44 and the MSC 52 in the visiting network 50. The MSC 52 then establishes an outgoing leg to the roaming mobile.

Subscriber information relating to CAMEL-based services, (referred to hereafter as CAMEL subscriber information (CSI)), is stored in individual mobile subscriber records as appropriate. The CSI is then transferred to a MSC/VLR currently serving that mobile subscriber to ensure that the CAMEL-based service is invoked at outgoing calls. Therefore, to provide network-specific supplementary services on a network wide basis to potential mobile stations that may require service from that network, the individual subscriber records of all those potential mobiles in their respective home location registers need to include the CSI for that network-based service. The example mentioned above is a network-specific service of the home network operator permitting dialing of a short number code, e.g., 133, to access a mobile subscriber's voice mailbox and listen to the stored messages. The service translates the short code into a full, routable telephony number.

If every potential subscriber is to have the possibility of receiving this network-based service when operating within a visiting network, it is necessary for network-specific supplementary service information corresponding to this example service to be stored in every potential mobile subscriber record. However, because this network-specific supplementary service information is the same for all the potential subscribers, this repetitive storage of the same information is wasteful of memory resources, time consuming to administer, and difficult to update. The present invention obviates these problems by (1) storing the network-specific supplementary service information only once or a limited number of times in an HLR and (2) linking each potential subscriber record to that information using a flag or other indicator provided in the subscriber's record. When the subscriber's HLR record is accessed, the HLR provides a copy of the network-specific supplementary service information to the servicing MSC/VLR if the corresponding flag is set/activated.

Figure 3:
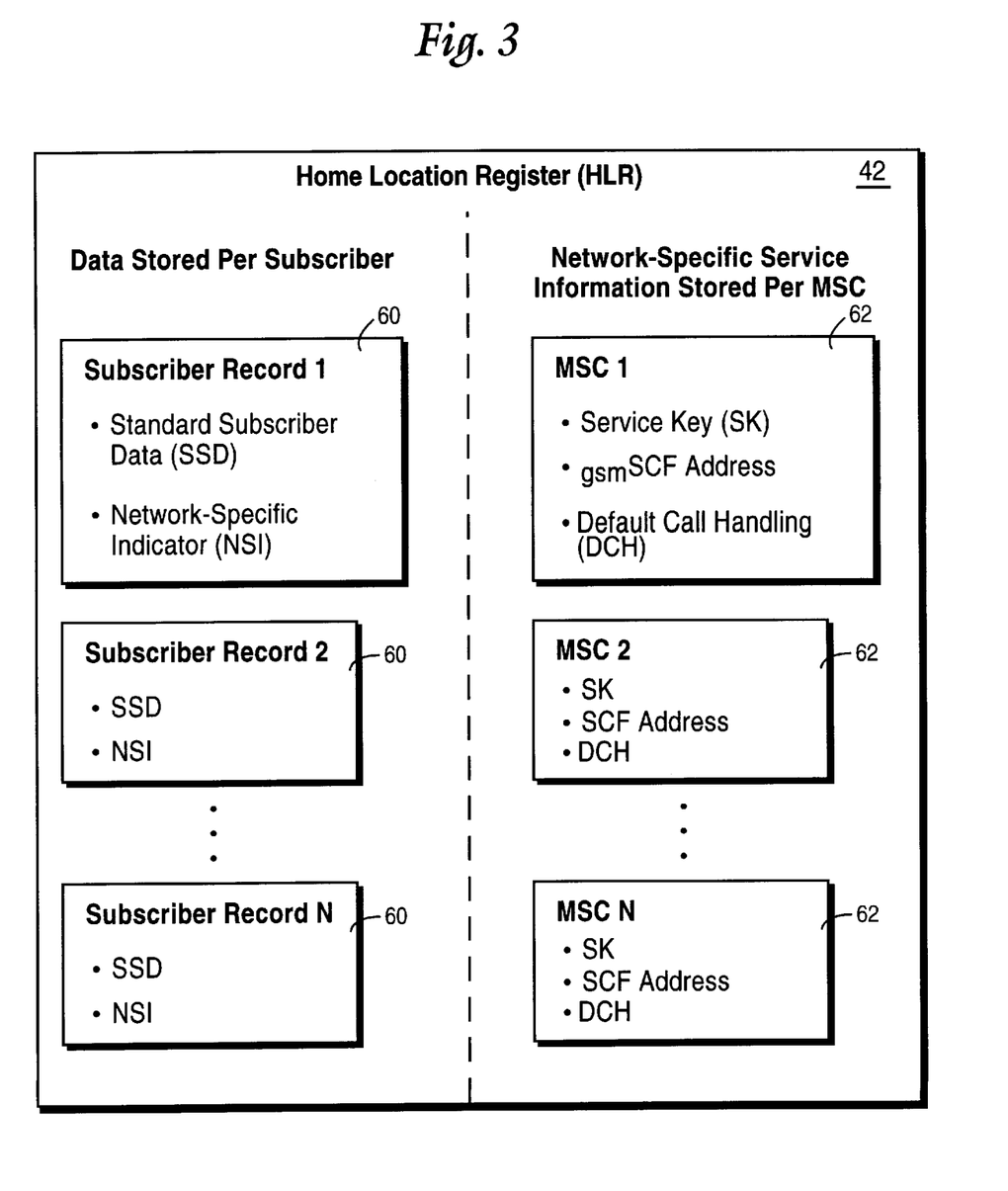
FIG. 3 is a function block diagram illustrating network-specific service information stored in a home location register (HLR) in accordance with an example of the present invention.

An example HLR configuration is now described in conjunction with FIG. 3. The home location register 42 stores a number of subscriber records 60 including subscriber records 1, 2, . . . N. Each subscriber record includes standard individual subscriber data such as MSISDN, IMSI, current VLR location, and supplementary services data. In accordance with the present invention, each subscriber record may include one or more network-specific indicators, e.g., one or more flags, corresponding to one or more network-specific services. Only one network-specific service indicator is shown for purposes of illustration. Each network-specific indicator is then set or activated when that subscriber is to receive a corresponding network-based service in a network that supports that network-based service. If that subscriber is not to receive the service, the flag is reset or otherwise deactivated.

The home location register 42 also stores the network-specific service information for each MSC (not each subscriber) that supports that network-specific service. In the example shown in FIG. 3, the network-specific service is stored for each MSC 62. Accordingly, the network-specific service information is stored for MSC 1, MSC 2, . . . MSC N. The network-specific service information includes a service key which identifies the network-specific service, e.g., the short number voice mail service described above, and a gsmSCF address which indicates the gsmSCF node used to implement the network-specific service using, in the preferred example embodiment, CAMEL-based, IN-type procedures. Also stored is a default call handling procedure to be followed by the serving MSC if something goes wrong in the process of trying to set up or otherwise provide the network-specific service.

Alternatively, the network-specific service information may be stored for each MSC number series where plural MSCs may be a part of the same telephone network number series. An MSC number series is a group of MSCs which are identified by numbers within a certain number range, e.g., +467070001 to +467070009, is an MSC number series containing nine MSCs.

In operation, when the HLR receives a location update request or initiates a stand-alone message to insert subscriber data (due to data being inserted or modified in the HLR), the HLR checks whether the network-specific indicator is set for that particular mobile subscriber. If so, the network-specific service information stored for the particular MSC in the HLR is sent to the MSC where the subscriber is registered or is in the process of being registered. Since that network-specific service information for that particular subscriber is stored in the VLR of the serving MSC, the CAMEL service indicated by that information will be invoked for calls involving the subscriber in that network.

Figure 4:
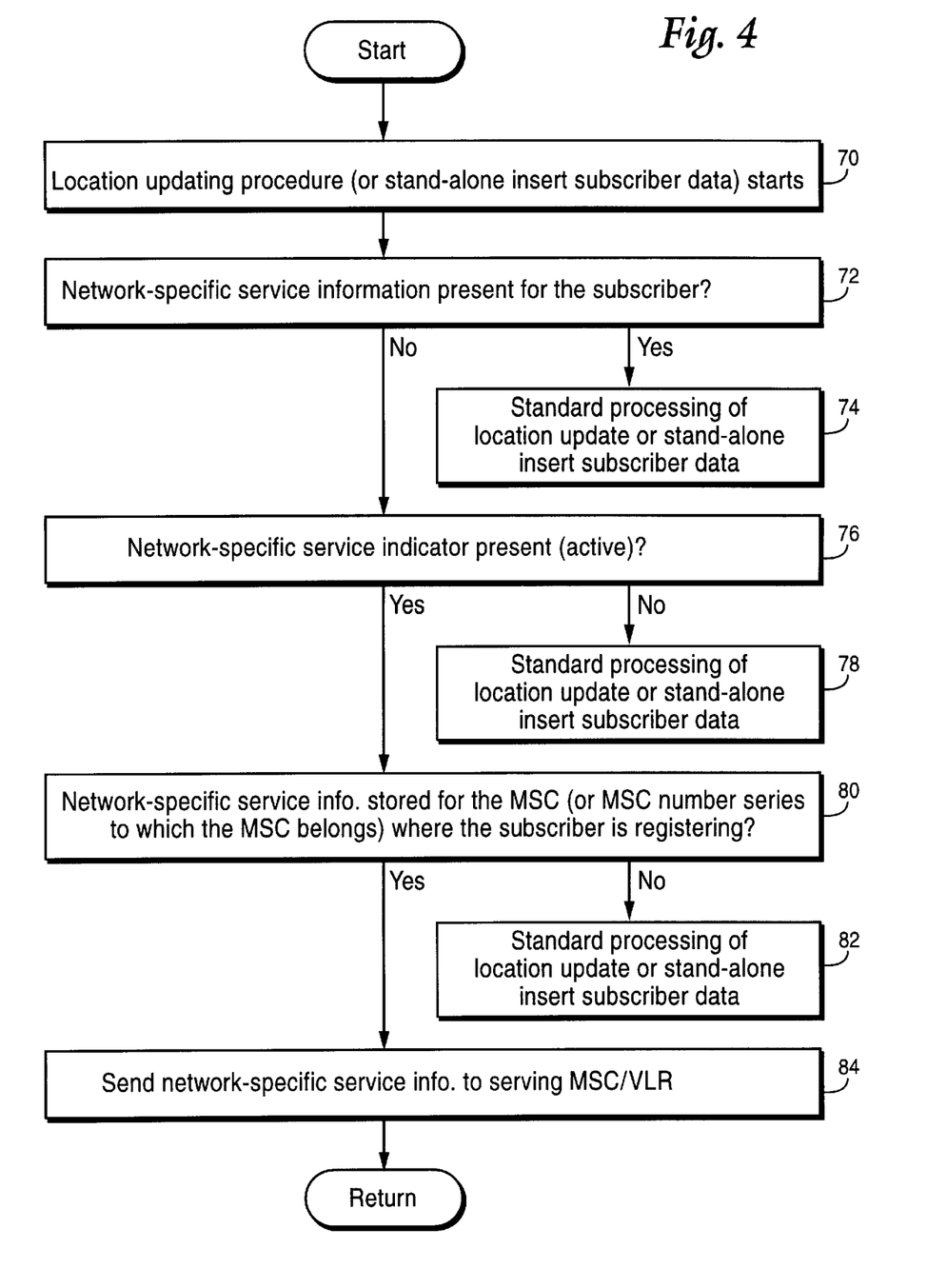
FIG. 4 is a flowchart outlining an example set of procedures for implementing the present invention in a GSM-based mobile communications system supported by CAMEL-based services.

FIG. 4 shows example procedures in flowchart form. A location updating procedure or stand-alone insert subscriber data procedure commences in block 70. A determination is made whether network-specific service information is stored in the subscriber's HLR database record (block 72). If so, the HLR already has the information needed to provide the network-specific service for this mobile subscriber, and therefore standard location update procedures continue (block 74). Otherwise, the HLR decides whether a network-specific service indicator is present or otherwise active in that mobile subscriber's HLR record (block 76). If not, insert subscriber data processing continues (block 78). If so, the HLR determines whether the network-specific service information corresponding to the active indicator is stored in the HLR for the MSC (or MSC number series to which the MSC belongs) where the subscriber is currently registering or registered (block 80). If not, this standard processing of the insert subscriber data continues (block 82). Otherwise, the network-specific service information is sent from the HLR to the MSC/VLR where the subscriber is registering (block 84).

Figure 5:
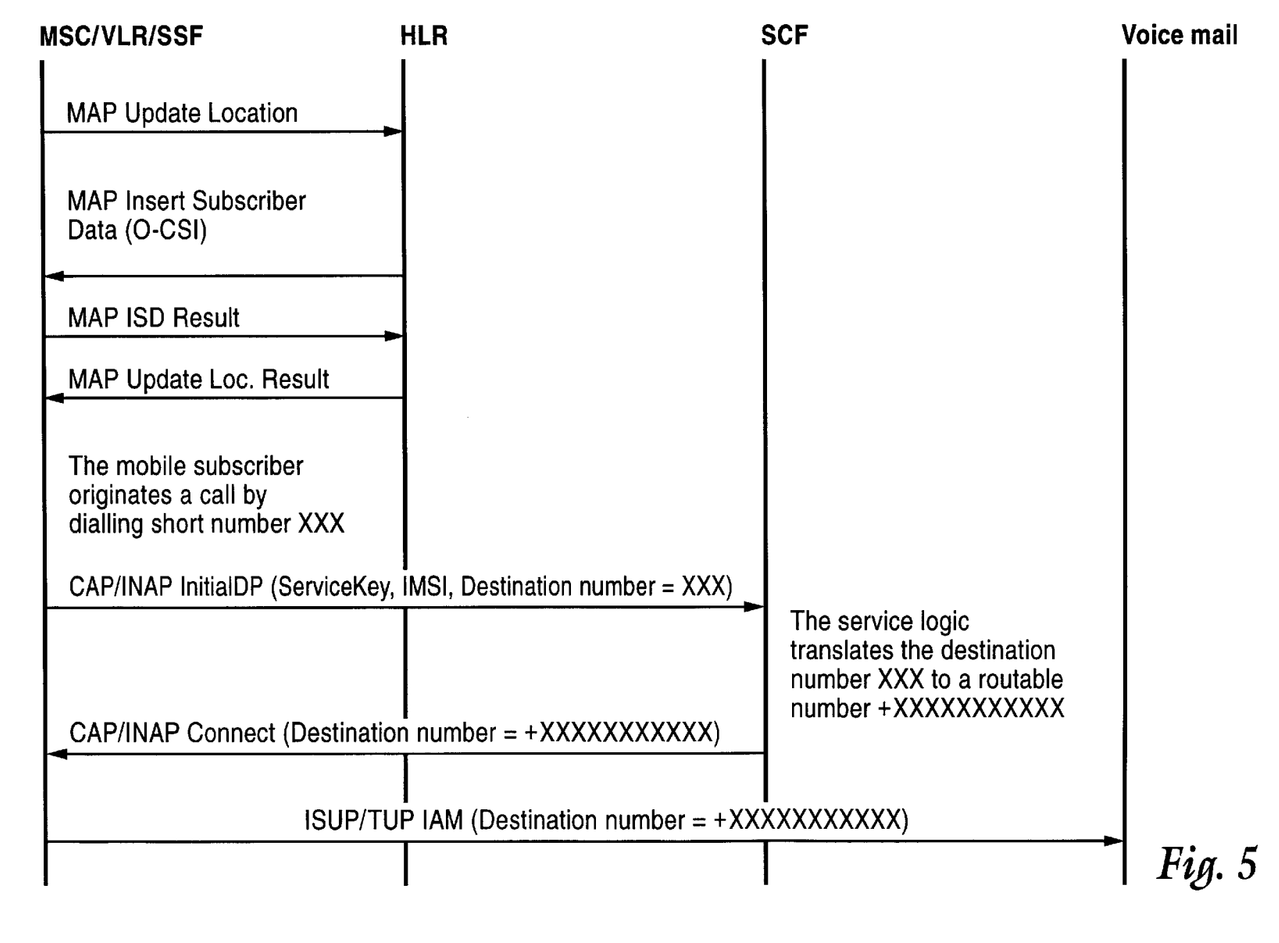
FIG. 5 is an example signal flow diagram between the GSM/CAMEL-based functional entities shown in FIG. 2 for implementing a short number, voice mail access service provided in a visiting mobile network to a roaming mobile station.

FIG. 5 illustrates the example of a network-specific short number voice mail access service provided using a GSM/CAMEL-based signaling model. A MAP update location message is sent from the MSC/VLR to the mobile subscriber's HLR when the mobile subscriber registers with that MSC/VLR. The MSC/VLR may be in the home network or in a visiting network. As part of handling the update location request in the HLR, the HLR determines if a network-specific indicator is active. If so, the HLR sends the Originating-CAMEL Subscription Information (O-CSI) corresponding to the short number voice mail access service to the MSC/VLR. When the mobile subscriber originates a call, the CAMEL service switching function (SSF) integrated with the MSC is invoked as a result of the O-CSI information being stored in the MSC/VLR for this mobile subscriber. An Intelligent Network Application Part (INAP)/CAP initial detection message is sent to the CAMEL Service Control Function (SCF) at the SCP identified by the gsmSCF address included in the O-CSI information. The O-CSI information also contains the service key corresponding to the short number, voice mail access, network-specific service which is sent to the SCF together with call data (in this example, the dialed short number) and the mobile subscriber identification. The SCF uses the service key and/or the identity of the mobile subscriber to determine that a number translation service needs to be executed. The SCF translates the dialed short number represented as xxx to a full number represented as +xxxxxxxxxxx (normally an E.164 number) and sends the full number to the MSC/VLR/SSF in an INAP/CAP connect message. The call is routed based on the full number received from the SCF to the final destination, which in this example is a voice mailbox, in accordance with a known protocol format such as an ISUP/TUP Initial Address Message (IAM).

Because the present invention stores network-specific supplementary service information only once (or a limited number of times) in an HLR, the amount of data which must be stored in the HLR to provide network-specific supplementary services is dramatically reduced. Instead of copying the same network-specific supplementary service information into every potential mobile subscriber's HLR record, the present invention links those subscriber records to one or more network-specific supplementary services by a flag or other indicator. That way, when the subscriber's record is accessed in the process of delivering services in a home or visiting network, the HLR can provide the network-specific supplementary service information to the serving MSC/VLR if the flag is set/activated. Thus, it is a straightforward matter to add additional network-specific supplementary services and offer them to a large number of subscribers. Moreover, the present invention also provides considerable flexibility in that existing network-specific supplementary services can be altered for a large number of subscribers simply by changing the network-specific supplementary service information which is stored only once or a limited number of times in the HLR.

While the invention has been described in connection with practical and preferred embodiments, it is to be understood that the invention is not to be limited to the disclosed embodiments, but on the contrary, is intended to cover various modifications and equivalent arrangements included within the spirit and scope of the appended claims. For example and as mentioned above, the present invention is not limited to GSM or CAMEL-based systems.

What is claimed is:

1. In a mobile communications system including plural mobile communications service areas, each service area providing basic mobile telephony services to mobile communications units operating within the mobile communications service area, a method comprising the steps of:

providing a home database in a home mobile communications service area for storing subscriber records for mobile communications units subscribing to basic mobile telephony services from the home mobile communications service area;

storing in the home database for each of plural visiting mobile communications service areas, information relating to a network-specific service offered in each visiting mobile communications service area;

including in some of the subscriber records stored in the home database an indicator that indicates whether the network-specific service is activated; and based on the indication, transferring the network-specific service information corresponding to the network-specific service from the home database to a mobile switching node in the visiting service area for use in providing the network-specific service to the one mobile station in the visiting service area.

2. The method in claim 1, wherein the network-specific service information identifies the specific service and a control mechanism for implementing the specific service.

3. The method in claim 1, wherein the indicator is a flag in each of the plurality of subscriber records in the home database which when set activates the network-specific service for the corresponding mobile station.

4. The method in claim 3, the method further comprising:

storing the network-specific information relating to the network-specific service only once for each of the plural visiting service areas, wherein the set flag in each of the subscriber records links each subscriber record to the network-specific service.

5. The method in claim 1, further comprising:

receiving at the home database a request for subscriber data corresponding to the one mobile radio station;

checking the subscriber record stored in the home database whether the network-specific service is indicated as active, and if so, transferring the network-specific information corresponding to the network-specific service from the home database to a mobile switching node in the visiting service area, invoking the network-specific service when a call is made while the one mobile station is in the visiting service area.

6. The method in claim 1, wherein the network-specific service includes a short dialing number for access to electronically stored messages associated with the one mobile station.

7. The method in claim 1, wherein the network-specific service is provided using intelligent network service logic.

8. The method in claim 1, wherein each network-specific service record includes a service key and an SCP address.

9. The method in claim 8, wherein each network-specific service record includes a default call handling procedure.

10. The method in claim 9, wherein each network-specific service record includes a service key and an SCP address.

11. The method in claim 10, wherein each network-specific service record includes a default call handling procedure.

12. Apparatus for providing services in a mobile communications system including at least a home mobile communications network and a visiting mobile communications network, each mobile communications network providing basic mobile telephony services to mobile communications units operating within the mobile communications network, comprising:

a home mobile switching node directing calls to and from mobile communications units being served by the home mobile communications network;

one or more visiting mobile switching nodes directing calls to and from mobile communications units being served by the visiting mobile communications network, and in the home mobile communications network, a home database coupled to the home mobile switching node storing subscriber records for mobile communications units subscribing to the basic mobile telephony services from the home mobile communications network and one or more network-specific service records for each of the one or more visiting mobile switching, nodes, at least some of the subscriber records including one or more flags indicating whether the mobile communication unit corresponding to the subscriber record is to receive one or more network-specific services thereby linking those subscriber records to one or more network-specific service records, wherein the one or more network-specific service records are transferred from the home database to a mobile switching node currently serving the one mobile communications unit if the one or more flags are set in the subscriber record corresponding to the one mobile communications unit.

13. Apparatus as in claim 12, wherein the mobile switching node currently serving the one mobile communications unit is located in the home mobile communications network.

14. Apparatus as in claim 12, wherein the mobile switching node currently serving the one mobile communications unit is located in the visiting mobile communications network.

15. Apparatus as in claim 12, further comprising:

a service control node including service logic for providing the network-specific service when the one mobile communications unit triggers the one or more network-specific services.

16. Apparatus as in claim 15, further comprising:

a service switching function associated with the mobile switching node currently serving the one mobile communications unit detecting when the one mobile communications unit triggers the one or more network-specific services and communicating to the service control node a request to provide the one or more network-specific services to the one mobile communications unit.

17. Apparatus as in claim 12, wherein the mobile switching node currently serving the one mobile communications unit renders the one or more network-specific services to the one mobile communications unit.

18. Apparatus in claim 12, further comprising:

plural mobile switching nodes in the home and visiting mobile communications network, wherein the one or more network-specific service records are stored for a selected number series associated with one or more of the plural visiting mobile switching nodes that supports the one or more network-specific services, and wherein the one or more network-specific service records are transferred from the home database to the mobile switching node currently serving the one mobile communications unit only if the one or more network-specific service records are stored for the selected number series associated with the mobile switching node currently serving the one mobile communications unit.

19. Apparatus in claim 18, wherein the one or more network-specific service records are stored only once in the home database for each selected number series.

20. Apparatus in claim 15, wherein the one or more network-specific service records identify the network-specific service and the service control node.

21. Apparatus as in claim 12, wherein the one or more network-specific services include a number translation service that translates an abbreviated number dialed from the one mobile communications unit into a longer telephone routing number.

22. In a Global System for Mobile communications (GSM) including a home network having home location register (HLR) and a visiting network having a mobile switching center (MSC) providing basic mobile telephony call services and offering Customized Applications for Mobile Enhanced Logic (CAMEL) to design and offer supplementary services in addition to the basic mobile telephony call services, a method comprising the steps of:

maintaining subscriber records in the HLR for mobile communications units subscribing to basic mobile telephony services from the home network;

storing in the HLR a record related to a CAMEL-based, network-specific service in addition to the basic telephony services;

setting a flag in some of the subscriber records stored in the home database to indicate that the CAMEL-based, network-specific service should be invoked; and when one of the mobile communications units registers with a node in the network offering the CAMEL-based, network-specific service and the flag in the subscriber record corresponding to the mobile communications unit is set, sending the one CAMEL-based, network-specific service record from the HLR to the node.

23. The method in claim 22, wherein the node is a visiting location register in the home network.

24. The method in claim 22, wherein the node is a visiting location register in the visiting network.

25. The method in claim 22, further comprising:

detecting when the CAMEL-based, network-specific service should be invoked, and in response to that detection, invoking the CAMEL-based, network-specific service using the CAMEL-based, network-specific service record provided to that node.

26. The method in claim 22, wherein an intelligent service control point (SCP) is provided to implement CAMEL-based services, the method including:

sending the CAMEL-based service record to the SCP, and the SCP using the CAMEL-based, network-specific service record to provide the CAMEL-based, network-specific service to the one mobile communications unit.

27. The method in claim 22, wherein the CAMEL-based, network-specific service includes a voice mail access service that provides access to messages stored in a voice mail box corresponding to the one mobile communications unit after entry of an abbreviated code.

28. The method in claim 22, wherein the CAMEL-based service information is stored only once in the HLR for the node.

29. The method in claim 26, wherein the GSM includes plural visiting MSCs and a CAMEL-based, network-specific service record is stored in the HLR for each visiting MSC.

30. The method in claim 29, wherein each network-specific service record includes a service key and an SCP address.

31. The method in claim 30, wherein each network-specific service record includes a default call handling procedure.

* * * * *